(12) United States Patent
Manji et al.

(10) Patent No.: US 11,981,307 B2
(45) Date of Patent: May 14, 2024

(54) WORK VEHICLE

(71) Applicant: Kubota Corporation, Osaka (JP)

(72) Inventors: Yasuhiro Manji, Sakai (JP); Masahiro Yamada, Sakai (JP); Hirokazu Ito, Sakai (JP)

(73) Assignee: Kubota Corporation, Osaka (JP)

( * ) Notice: Subject to any disclaimer, the term of this patent is extended or adjusted under 35 U.S.C. 154(b) by 70 days.

(21) Appl. No.: 17/840,251

(22) Filed: Jun. 14, 2022

(65) Prior Publication Data
US 2023/0062469 A1 Mar. 2, 2023

(30) Foreign Application Priority Data

Sep. 1, 2021 (JP) ................................. 2021-142266

(51) Int. Cl.
| | | |
|---|---|---|
| *B60T 13/74* | (2006.01) | |
| *A01B 76/00* | (2006.01) | |
| *A01D 34/82* | (2006.01) | |
| *B60Q 9/00* | (2006.01) | |
| *B60T 7/04* | (2006.01) | |
| *B60L 15/20* | (2006.01) | |
| *F16D 121/22* | (2012.01) | |

(52) U.S. Cl.
CPC .............. *B60T 7/045* (2013.01); *A01B 76/00* (2013.01); *A01D 34/828* (2013.01); *B60Q 9/00* (2013.01); *B60T 13/743* (2013.01); *B60L 15/2009* (2013.01); *F16D 2121/22* (2013.01)

(58) Field of Classification Search
CPC .... B60T 7/047; B60T 13/743; F16D 2121/26; A01B 76/00; A01D 34/828; A01D 69/10; B60Q 9/00; B60L 15/2009
See application file for complete search history.

(56) References Cited

U.S. PATENT DOCUMENTS

| | | | |
|---|---|---|---|
| 8,662,600 B2 | 3/2014 | Koga et al. | |
| 2004/0050026 A1* | 3/2004 | Stover | A01D 69/10 56/11.3 |
| 2011/0154941 A1* | 6/2011 | Gibbs | F16C 1/12 74/503 |

(Continued)

FOREIGN PATENT DOCUMENTS

| | | | | |
|---|---|---|---|---|
| CN | 112449842 A | * | 3/2021 | ............. A01D 34/63 |
| JP | 202065469 A | | 4/2020 | |

OTHER PUBLICATIONS

Chen, Brake Releasing Device And Electric Mowing Machine, Mar. 9, 2021, EPO, CN 112449842 A, Machine Translation of Description (Year: 2021).*

*Primary Examiner* — Amy R Weisberg
*Assistant Examiner* — Matthew D Lee
(74) *Attorney, Agent, or Firm* — The Webb Law Firm

(57) ABSTRACT

A work vehicle includes: a body; a travel device supporting the body; a travel driver configured to drive the travel device; a brake configured to lock and unlock the travel device; a deactivation operation tool manually movable to a first position, at which the brake is operable to be activated and deactivated, and a second position, at which the brake is kept deactivated; a position detector configured to detect that the deactivation operation tool is at the second position; and a notifier configured to provide, based on a result of the detection by the position detector, a notification that the deactivation operation tool is at the second position.

7 Claims, 6 Drawing Sheets

(56) References Cited

U.S. PATENT DOCUMENTS

| | | | | |
|---|---|---|---|---|
| 2014/0260151 A1* | 9/2014 | Poe | ........................ | A01D 69/10 |
| | | | | 56/11.3 |
| 2016/0347292 A1* | 12/2016 | Schmitt | ..................... | B60T 7/12 |
| 2019/0387670 A1 | 12/2019 | Matsuda et al. | | |

* cited by examiner

WORK VEHICLE

CROSS-REFERENCE TO RELATED APPLICATION

This application claims priority to Japanese Patent Application No. 2021-142266 filed Sep. 1, 2021, the disclosure of which is hereby incorporated by reference in its entirety.

BACKGROUND OF THE INVENTION

Field of the Invention

The present invention relates to a work vehicle including brakes each operable to lock and unlock a travel device.

Description of Related Art

A riding-type, motor-powered mower as an example work vehicle includes brakes each operable by means of a brake pedal to lock a travel wheel, as disclosed in Patent Literature 1.

The mower further includes, for example, lock members each configured to keep the corresponding brake pedal as pressed and thereby keep the corresponding brake activated. This allows the brakes to each function as a parking brake as well.

Patent Literature 1: Japanese Unexamined Patent Application Publication, Tokukai, No. 2020-65469 (JP2020-65469A)

SUMMARY OF THE INVENTION

If, for instance, a work vehicle has broken down and is to be towed by another vehicle, the brakes need to be kept deactivated. This has led to the idea of producing a work vehicle with a deactivation operation tool manually operable to keep a brake deactivated.

The present invention has an object of providing a work vehicle that includes a deactivation operation tool for use to keep a brake deactivated for the work vehicle to be towed and that is capable of then transitioning into its normal work state smoothly.

A work vehicle of the present invention includes: a body; a travel device supporting the body; a travel driver configured to drive the travel device; a brake configured to lock and unlock the travel device; a deactivation operation tool manually movable to a first position, at which the brake is operable to be activated and deactivated, and a second position, at which the brake is kept deactivated; a position detector configured to detect that the deactivation operation tool is at the second position; and a notifier configured to provide, based on a result of the detection by the position detector, a notification that the deactivation operation tool is at the second position.

With the above configuration, the operator can move the deactivation operation tool to the first position to allow the brake to be activated and deactivated in the normal work state.

The operator can also move the deactivation operation tool to the second position to keep the brake deactivated if, for instance, the work vehicle has broken down and needs to be towed.

With the above configuration, in response to the operator moving the deactivation operation tool to the second position to keep the brake deactivated as described above, the position detector detects that the deactivation operation tool is at the second position, and the notifier notifies the operator that the deactivation operation tool is at the second position.

This configuration allows the operator to remember to move the deactivation operation tool to the first position on the basis of the notification by the notifier when the work vehicle returns to its normal work state after being towed. The above configuration, in other words, reduces the risk of the work vehicle transitioning into its normal work state with the deactivation operation tool remaining at the second position (that is, with the brake kept deactivated).

The work vehicle may preferably further include: a brake operation section configured to activate the brake in response to the travel driver being turned off and deactivate the brake in response to the travel driver being turned on, wherein the deactivation operation tool being moved to the second position is effective regardless of an operation of the brake operation section.

With the above configuration, the brake operation section, with the deactivation operation tool at the first position, automatically activates and deactivates the brake in response to the travel driver being turned on and off. Turning off the travel driver allows the brake to function as a parking brake as well conveniently.

With the above configuration, moving the deactivation operation tool to the second position allows the brake to be kept deactivated, as the deactivation operation tool being at the second position is effective regardless of the operation of the brake operation section, that is, the brake operation section does not activate the brake. This allows the work vehicle to be towed with the brake kept deactivated regardless of the operation of the brake operation section.

The work vehicle may preferably be further arranged such that the brake operation section includes: an urging member configured to urge the brake for the activation thereof; and an electromagnetic operation section configured to, in response to the travel driver being turned off, allow the urging member to urge the brake for the activation thereof and, in response to the travel driver being turned on, deactivate the brake against an urging force of the urging member.

The above configuration includes an urging member and an electromagnetic operation section for the brake operation section to have an advantageously simple structure.

With the above configuration, the urging member of the brake operation section urges the brake for its activation to allow the brake to function as a negative brake, with the result of an improved functionality for the brake.

The work vehicle may preferably further include: a travel prohibitor configured to, in response to the result of the detection by the position detector indicating that the deactivation operation tool is at the second position, prohibit the travel driver from being turned on.

With the above configuration, moving the deactivation operation tool to the second position to keep the brake deactivated not only causes the notifier to notify the operator that the deactivation operation tool is at the second position, but also causes the travel prohibitor to prohibit the travel driver from being turned on. With the deactivation operation tool at the second position, the work vehicle is unable to travel.

The above configuration thus eliminates the risk of the work vehicle transitioning into its normal work state with the deactivation operation tool remaining at the second position (that is, with the brake kept deactivated).

DESCRIPTION OF THE INVENTION

FIGS. 1 to 6 illustrate a motor-powered, riding-type mower as an example work vehicle. FIGS. 1 to 6 show arrow F to indicate the forward direction, arrow B to indicate the backward direction, arrow U to indicate the upward direction, arrow D to indicate the downward direction, arrow L to indicate the leftward direction, and arrow R to indicate the rightward direction.

Overall Configuration of Riding-type Mower

Figure 1:
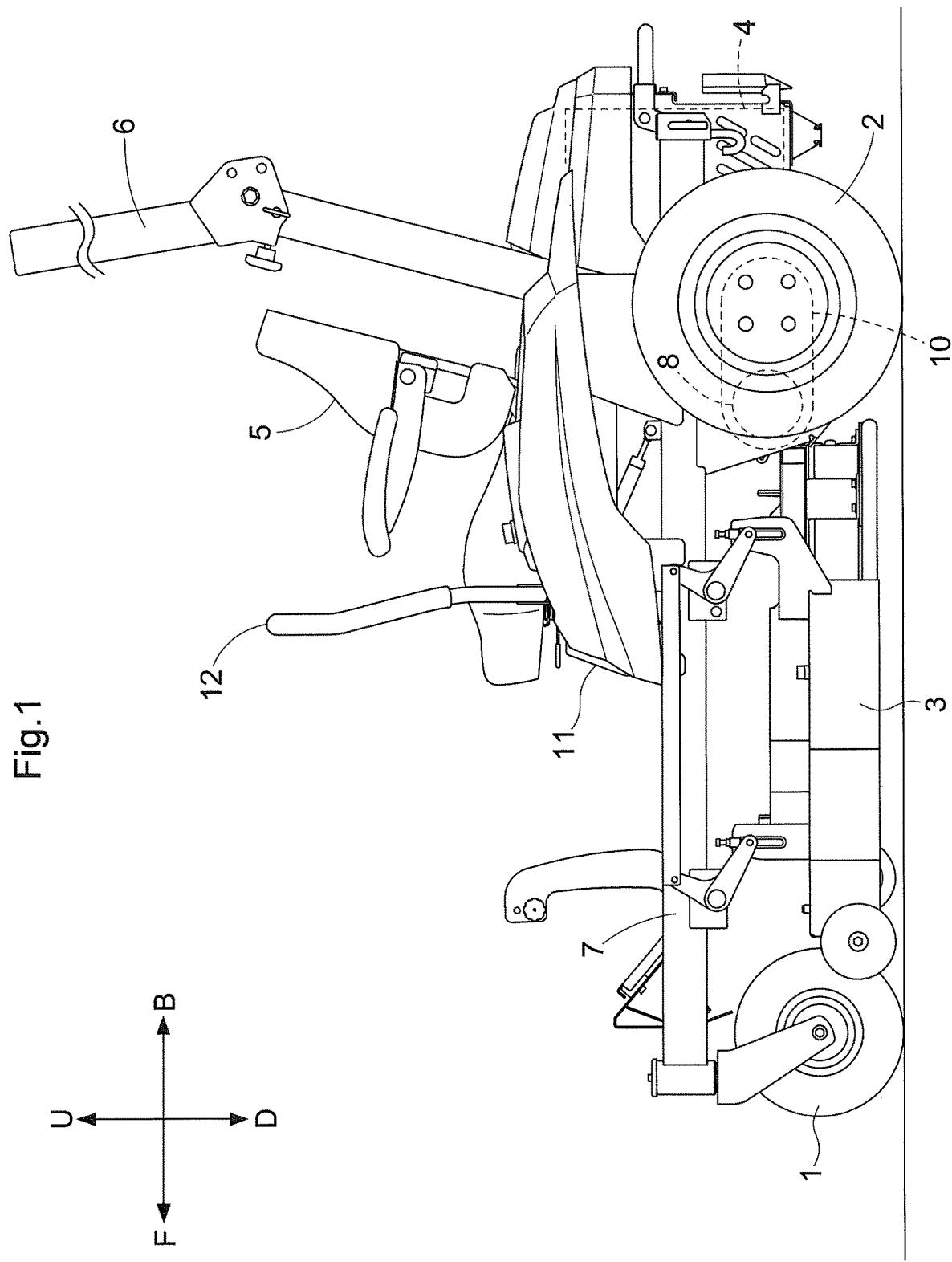
FIG. 1 is a left side view of a riding-type mower.

As illustrated in FIG. 1, the riding-type mower includes a body 7, left and right front wheels 1 at a front portion of the body 7, and left and right rear wheels 2 (which corresponds to the "travel device") at a back portion of the body 7. The front wheels 1 and the rear wheels 2 support the body 7. The riding-type mower also includes a mower 3 suspended from a lower portion of the body 7 between the front wheels 1 and the rear wheels 2, a battery 4 held by a back portion of the body 7 between the rear wheels 2, a driver's seat 5 at an upper portion of the body 7, and a roll-over protective structure (ROPS) frame 6 at an upper portion of the body 7.

Configuration Related to Front and Rear Wheels

As illustrated in FIG. 1, the front wheels 1 are each in the form of a caster wheel capable of being turned freely about an axis extending in the up-down direction. The left and right front wheels 1 are held respectively by left and right front portions of the body 7.

Figure 2:
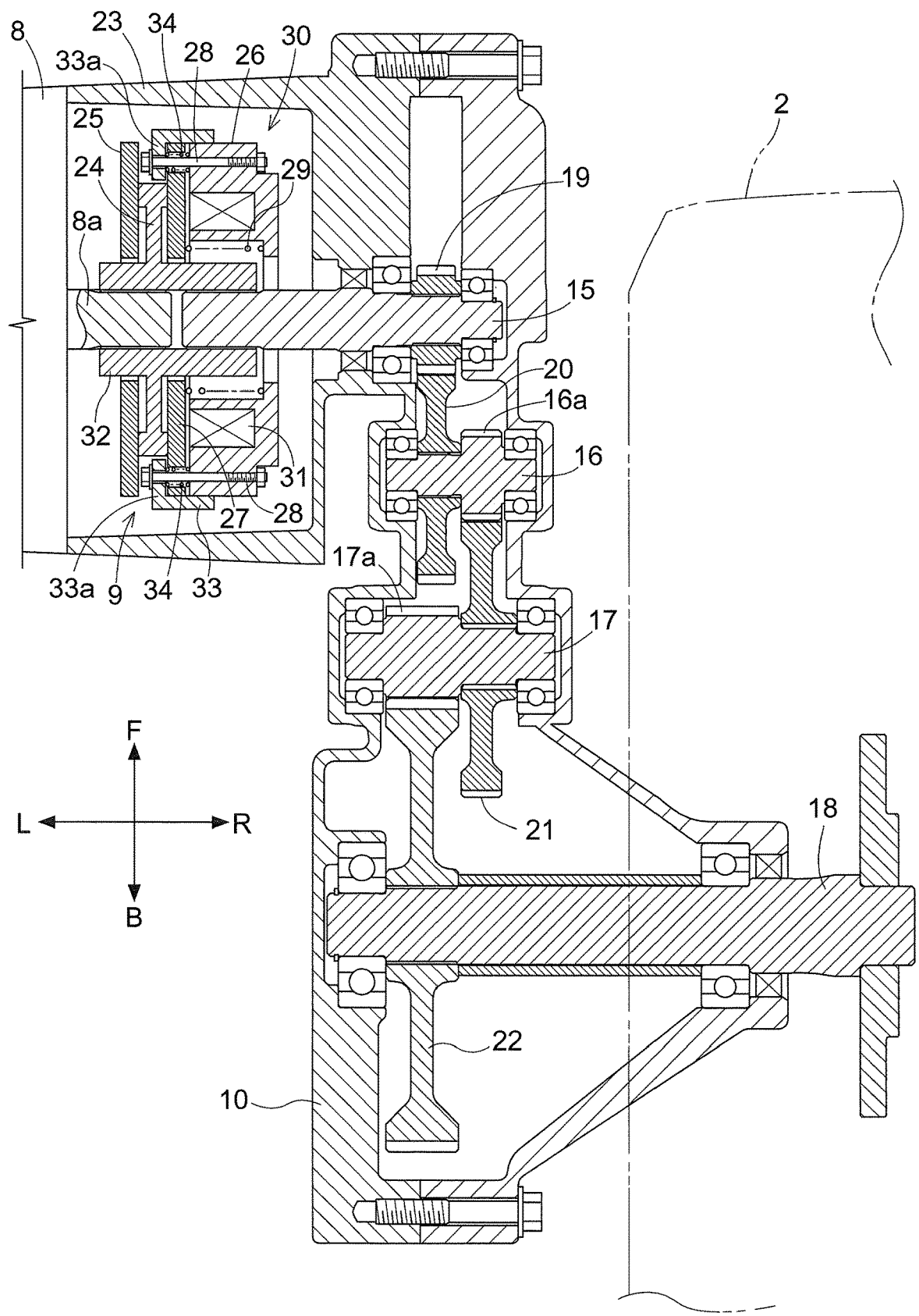
FIG. 2 is a cross-sectional plan view of an electric motor, a brake, a brake operation section, a deceleration case, and a portion therearound.
Figure 3:
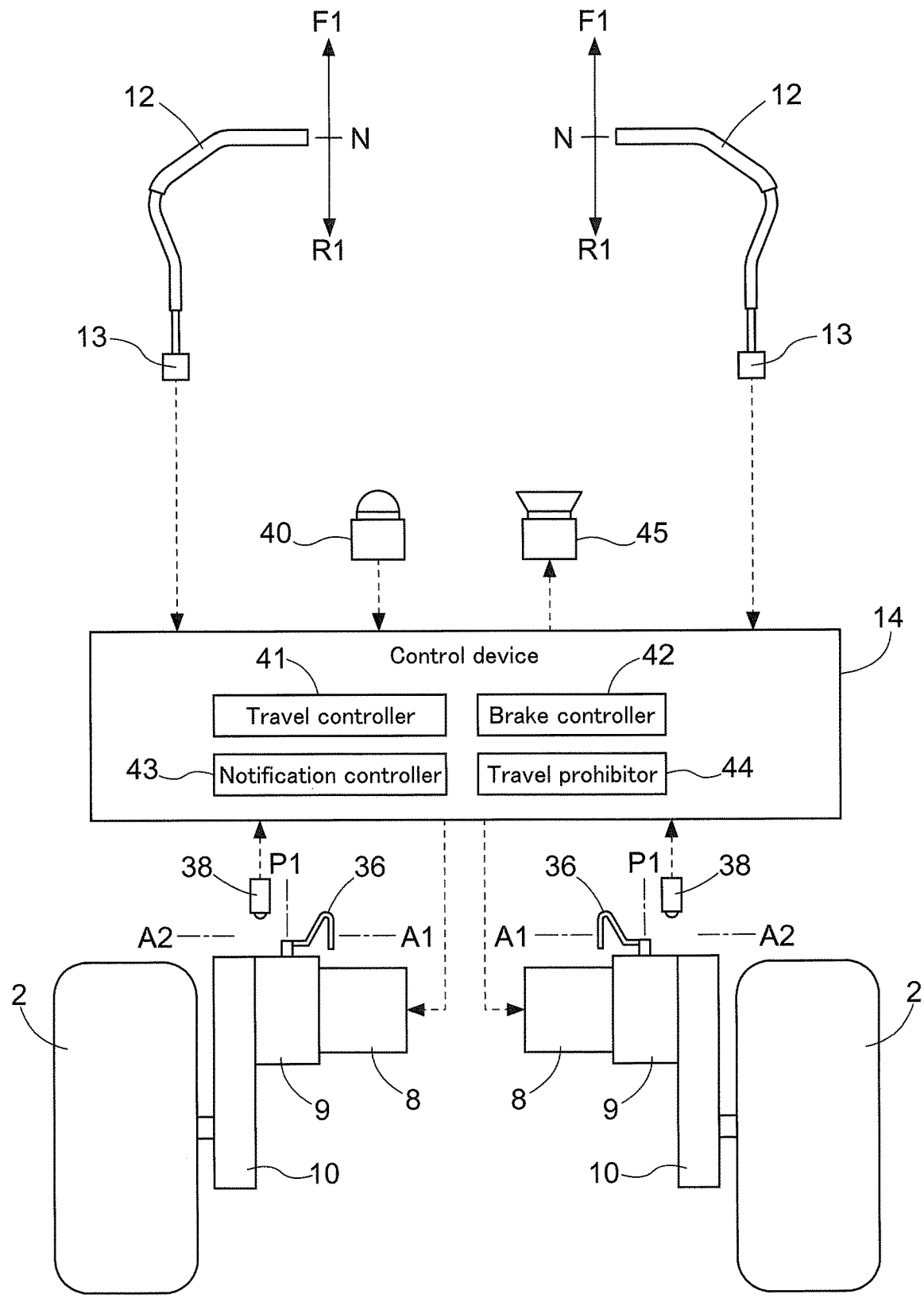
FIG. 3 is a diagram schematically illustrating a control configuration.

As illustrated in FIGS. 1, 2, and 3, the riding-type mower includes a right electric motor 8 (which corresponds to the "travel driver"), a right brake 9 (as contained in a right brake case 23), and a right deceleration case 10, all of which are held by a right back portion of the body 7. The right rear wheel 2 is held by the right deceleration case 10. The riding-type mower also includes a left electric motor 8 (which corresponds to the "travel driver"), a left brake 9 (as contained in a left brake case 23), and a left deceleration case 10, all of which are held by a left back portion of the body 7. The left rear wheel 2 is held by the left deceleration case 10.

As illustrated in FIGS. 2 and 3, each electric motor 8 is coupled to the corresponding deceleration case 10 with the corresponding brake case 23 in-between, which contains the corresponding brake 9 and a corresponding brake operation section 30. Specifically, the electric motor 8 includes an output shaft 8a, whereas the deceleration case 10 includes an input shaft 15. The two shafts are inserted in the brake case 23, and are coupled to each other with use of a cylindrical coupling member 32 in spline engagement.

The deceleration case 10 contains and holds two power transmission shafts 16 and 17 and an axle 18. The input shaft 15 is provided with a power transmission gear 19 attached thereto. The power transmission shaft 16 is provided with a power transmission gear 20. The two power transmission gears 19 and 20 mesh with each other. The power transmission shaft 16 is provided with a power transmission gear 16a. The power transmission shaft 17 is provided with a power transmission gear 21 attached thereto. The two power transmission gears 16a and 21 mesh with each other. The power transmission shaft 17 is provided with a power transmission gear 17a. The axle 18 is provided with a power transmission gear 22 attached thereto. The two power transmission gears 17a and 22 mesh with each other. The axle 18 is provided with the corresponding rear wheel 2 attached thereto.

The above configuration allows each electric motor 8 to transmit its motive power to the corresponding rear wheel 2 through the input shaft 15, the power transmission gear 20, the power transmission shaft 16, the power transmission gear 21, the power transmission shaft 17, the power transmission gear 22, and the axle 18 in the corresponding deceleration case 10 to drive the rear wheel 2 to rotate. The left and right electric motors 8 thus drive the left and right rear wheels 2 for rotation respectively and independently of each other.

Operating Electric Motors

As illustrated in FIGS. 1 and 3, the riding-type mower includes left and right fenders 11 above the respective rear wheels 2 and left and right shift levers 12 at front portions of the respective fenders 11. The shift levers 12 are each independently operable toward a forward travel side F1, which is forward of the neutral position N, and a rearward travel side R1, which is rearward of the neutral position N.

The riding-type mower includes left and right position sensors 13 and a control device 14 on the body 7. The position sensors 13 are each configured to detect the position of the corresponding shift lever 12 as operated and transmit the detection result to the control device 14. The control device 14 includes a travel controller 41 in the form of software. The control device 14 (specifically, the travel controller 41) operates the left and right electric motors 8 independently of each other as below on the basis of the respective positions of the shift levers 12 as operated.

Moving the right shift lever 12 to the neutral position N stops the right electric motor 8. Moving the right shift lever 12 toward the forward travel side F1 rotates the right electric motor 8 for forward travel. Moving the right shift lever 12 as such to a greater extent rotates the right electric motor 8 for forward travel at a higher speed. Moving the right shift lever 12 toward the rearward travel side R1 rotates the right electric motor 8 for rearward travel. Moving the right shift lever 12 as such to a greater extent rotates the right electric motor 8 for rearward travel at a higher speed.

Moving the left shift lever 12 to the neutral position N or toward the forward travel side F1 or rearward travel side R1 causes the left electric motor 8 to operate in a manner similar to the above.

As described above, moving the left and right shift levers 12 drives the left and right rear wheels 2 for rotation independently of each other to cause the riding-type mower to travel forward and backward and turn to the left and right.

Configurations of Brakes and Brake Operation Sections

As illustrated in FIG. 2, the right brake case 23 contains a right brake 9 and a right brake operation section 30. The left brake case 23 similarly contains a left brake 9 and a left brake operation section 30.

Each brake 9 includes a disk-shaped brake plate 24 coupled to the corresponding coupling member 32. The brake plate 24 is capable of rotation integral with the output shaft 8a of the corresponding electric motor 8 and the input shaft 15 of the corresponding deceleration case 10. The brake plate 24 is capable of moving slightly along the respective axes of the output shaft 8a and the input shaft 15 due to the spline engagement of the coupling member 32.

The brake 9 further includes a disk-shaped brake plate 25 between the electric motor 8 and the brake plate 24 and a ring-shaped operation case 26 between the deceleration case 10 and the brake plate 24.

The operation case 26 is coupled to the deceleration case 10 and the corresponding brake case 23, and is incapable of moving along the axis of the output shaft 8a or of rotation. The brake plate 25 is coupled to the operation case 26 with use of a coupling pin (not illustrated in the drawings), so that the brake plate 25 is incapable of moving along the axis of the output shaft 8a or of rotation.

The brake 9 further includes a disk-shaped metal brake plate 27 between the brake plate 24 and the operation case 26. The brake plate 27 is provided with a guide pin 28 of the operation case 26 inserted therethrough, so that the brake plate 27 is incapable of rotation due to the guide pin 28 but is movable along the axis of the output shaft 8a.

Each brake 9 configured above includes members such as brake plates 24, 25, and 27.

Each brake operation section 30 includes a spring 29 (which corresponds to the "urging member") in contact with the corresponding operation case 26 and the corresponding brake plate 27 and configured to urge the brake plate 27 toward the corresponding brake plate 24. The operation case 26 includes a plurality of magnetic coils 31 (which corresponds to the "electromagnetic operation section").

Each brake operation section 30 configured above includes members such as an operation case 26, a spring 29, and magnetic coils 31.

How Brakes and Brake Operation Sections Operate

As illustrated in FIG. 3, the control device 14 includes a brake controller 42 in the form of software. The control device 14 (specifically, the brake controller 42) operates the left and right brakes 9 and the left and right brake operation sections 30 independently of each other as below on the basis of the respective positions of the shift levers 12 as operated.

Moving the right shift lever 12 to the neutral position N (to stop the right electric motor 8) as described under "Operating Electric Motors" above stops the supply of electric power to the right brake operation section 30 (specifically, the magnetic coils 31).

The corresponding spring 29, in response, presses the corresponding brake plate 27 against the corresponding brake plate 24 as illustrated in FIG. 2, causing the brake plate 24 to be pressed against the corresponding brake plate 25 and thereby sandwiched between the brake plates 25 and 27, so that the corresponding brake 9 is activated. This locks the output shaft 8a of the right electric motor 8 and the right rear wheel 2.

Each brake 9 is configured to be urged by the corresponding spring 29 (urging member) into activation as described above. Stopping each electric motor 8 (travel driver) causes the corresponding magnetic coils 31 (electromagnetic operation section) to let the corresponding spring 29 (urging member) urge the corresponding brake 9 for activation, so that the brake 9 has been activated by the corresponding brake operation section 30.

Moving the right shift lever 12 toward the forward travel side F1 (to rotate the right electric motor 8) causes electric power to be supplied to the right brake operation section 30 (specifically, the magnetic coils 31). The magnetic coils 31, in response, attract the corresponding brake plate 27 toward themselves against the urging force of the corresponding spring 29 away from the corresponding brake plate 24, so that the corresponding brake 9 is deactivated. This unlocks the output shaft 8a of the right electric motor 8 and the right rear wheel 2. Moving the right shift lever 12 toward the rearward travel side R1 results in a similar operation.

As described above, driving each electric motor 8 (travel driver) causes the corresponding magnetic coils 31 (electromagnetic operation section) to attract the corresponding brake 9 against the urging force of the corresponding spring 29 (urging member) toward themselves for deactivation, so that the brake 9 has been deactivated by the corresponding brake operation section 30.

Moving the left shift lever 12 to the neutral position N or toward the forward travel side F1 or rearward travel side R1 causes the left brake 9 and the left brake operation section 30 to operate in a manner similar to the above.

Configuration Related to Deactivation Levers

Figure 4:
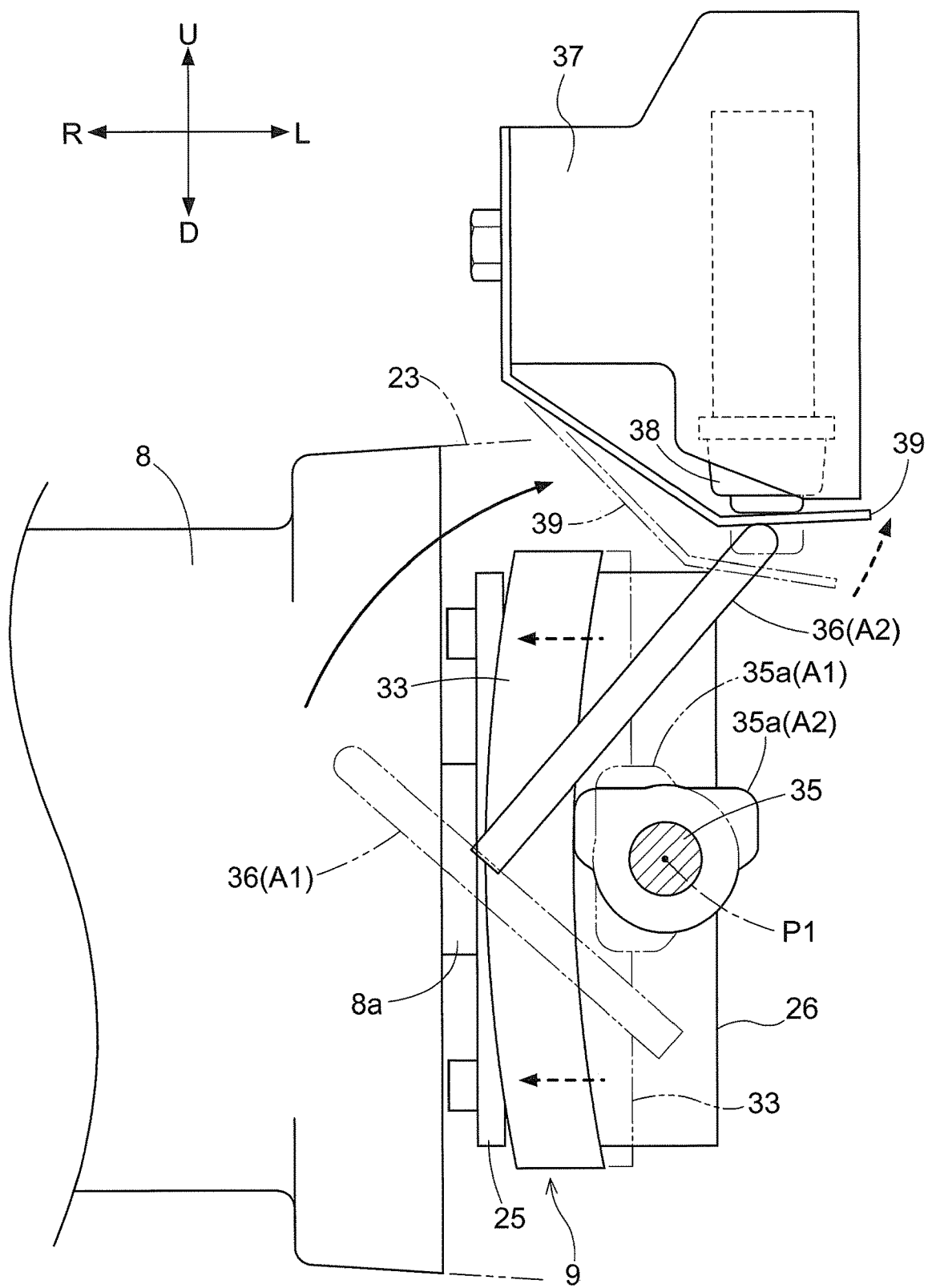
FIG. 4 is a front view of a deactivation lever, a position sensor, and a portion therearound.
Figure 5:
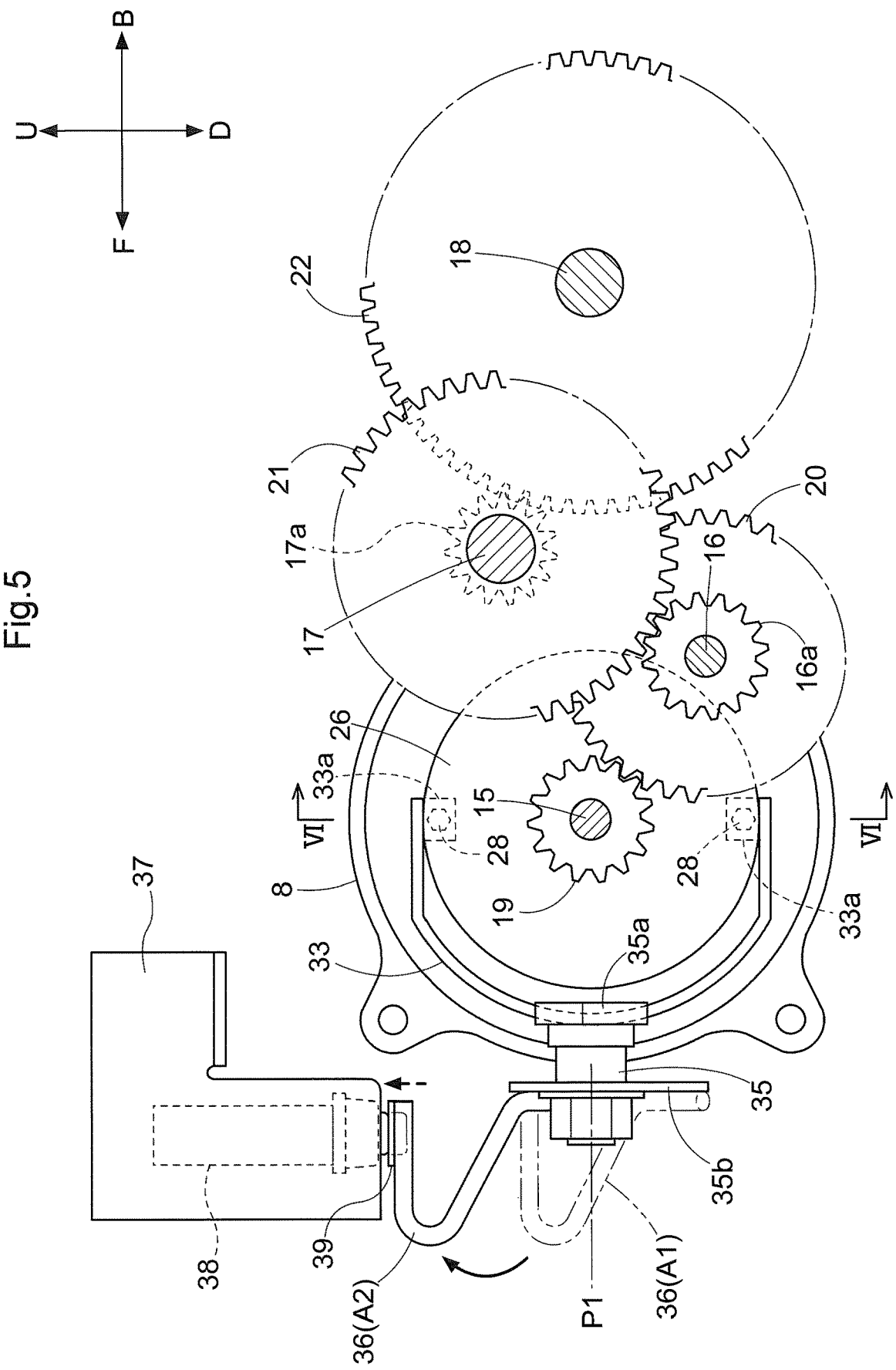
FIG. 5 is a cross-sectional side view of an electric motor, a brake, a brake operation section, a deceleration case, a deactivation lever, a position sensor, and a portion therearound.

As illustrated in FIGS. 2, 4, and 5, each brake operation section 30 includes a semicircular operation member 33 between the corresponding brake plates 25 and 27. The operation member 33 includes two attachment sections 33a each with an opening. The operation member 33 is provided with two guide pins 28 inserted in the respective openings so that the operation member 33 is supported by the guide pins 28 in such a manner as to be incapable of rotation.

The respective openings in the attachment sections 33a of the operation member 33 each have a diameter a little larger than the outer diameter of each guide pin 28. The brake operation section 30 further includes two springs 34 each pressing the corresponding attachment section 33a of the operation member 33 against the head 28a of the corresponding guide pin 28. This configuration allows the operation member 33 (specifically, the attachment sections 33a) to swing in the left-right direction about each guide pin 28.

As illustrated in FIGS. 4 and 5, the left and right brake operation sections 30 include respective left and right operation shafts 35. Each operation shaft 35 is supported by a front portion of the corresponding brake case 23 in such a manner as to be rotatable about an axis P1 extending in the front-back direction. The operation shaft 35 is provided with a cam 35a coupled thereto and facing the corresponding operation member 33 inside the brake case 23.

The operation shaft 35 is further provided with a support plate 35b coupled thereto outside (specifically, in front of) the brake case 23. The left and right brake operation sections 30 include respective left and right deactivation levers 36 (which corresponds to the "deactivation operation tool") each coupled to the support plate 35b of the corresponding operation shaft 35. The operator can hold each deactivation lever 36 to manually rotate the deactivation lever 36 and its corresponding operation shaft 35 about the corresponding axis P1.

FIGS. 4 and 5 each show with a double-dashed chain line that the right deactivation lever 36 (and the cam 35a on the corresponding operation shaft 35) has been moved to a first position A1. In this state, the cam 35a is off the corresponding operation member 33 such that the operation member 33 extends along the corresponding operation case 26 (that is, orthogonally to the output shaft 8a of the corresponding electric motor 8 and the corresponding input shaft 15) due to the press by the corresponding spring 34.

With each deactivation lever 36 at the first position A1, the corresponding brake operation section 30 activates and deactivates the corresponding brake 9 on the basis of the position of the corresponding shift lever 12 as operated, as described under "How Brakes and Brake Operation Sections Operate" above.

FIGS. 4 and 5 illustrate the following with solid lines: The operator can move the right deactivation lever 36 to a second position A2 to rotate the corresponding operation shaft 35 about the corresponding axis P1. This causes the cam 35a on the operation shaft 35 to press the corresponding operation member 33, which is, in response, swung about the corresponding guide pins 28 in the direction away from the corresponding operation case 26 toward the corresponding electric motor 8.

Figure 6:
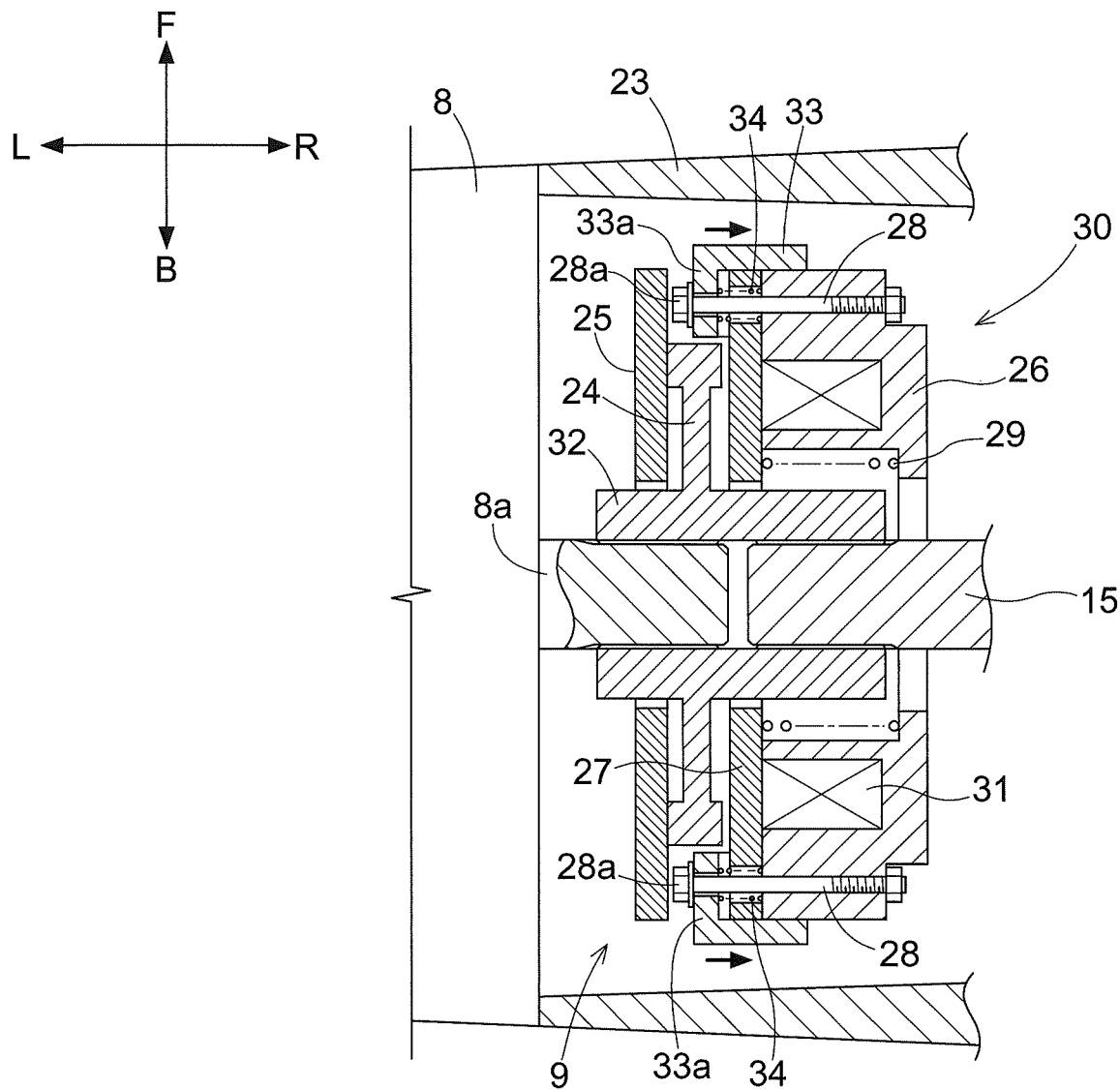
FIG. 6 is a cross-sectional view taken in direction VI-VI in FIG. 5, with the deactivation lever at a second position.

As illustrated in FIG. 6, the swing of the operation member 33 causes its attachment sections 33a to be each inclined while in contact with the head 28a of the corresponding guide pin 28. The attachment sections 33a thereby press the corresponding brake plate 27 toward the corresponding operation case 26. This forces the brake plate 27 away from the corresponding brake plate 24 toward the operation case 26 against the urging force of the corresponding spring 29, so that the brake plate 27 is kept apart from the brake plate 24.

With each deactivation lever 36 at the second position A2, moving the corresponding shift lever 12 to the neutral position N (and stop the corresponding electric motor 8) to stop the supply of electric power to the corresponding brake operation section 30 (specifically, the magnetic coils 31) as described under "How Brakes and Brake Operation Sections Operate" above will not let the corresponding spring 29 press the corresponding brake plate 27 against the corresponding brake plate 24 and will allow the brake plate 27 to be kept apart from the brake plate 24, so that the corresponding brake 9 remains deactivated.

As described above, each deactivation lever 36 (deactivation operation tool) being at the second position A2 allows the corresponding brake 9 to remain deactivated, and is effective regardless of the operation of the corresponding brake operation section 30.

Arrangement for Notification of Deactivation Levers being at Second Position

As illustrated in FIGS. 4 and 5, the body 7 is provided with left and right brackets 37 each in the shape of a box formed by bending a plate. The brackets 37 are each coupled to the body 7 above the corresponding deactivation lever 36. The brackets 37 are provided with respective left and right position sensors 38 (which corresponds to the "position detector") attached thereto each in the form of a limit switch. The brackets 37 are each provided with a plate spring 39 attached thereto and extending to a position under a detector at a lower portion of the corresponding position sensor 38.

Each deactivation lever 36 is, at the first position A1, away from the corresponding position sensor 38 and plate spring 39. Moving the deactivation lever 36 to the second position A2 causes the deactivation lever 36 to press the plate spring 39 upward, which in turn presses the detector of the position sensor 38 upward, so that the position sensor 38 detects that the deactivation lever 36 has been moved to the second position A2.

As illustrated in FIG. 3, the riding-type mower is provided with (i) a notification lamp 40 (which corresponds to the "notifier") on a portion of the left or right fender 11 which portion is near the corresponding shift lever 12 and (ii) a notification buzzer 45 (which corresponds to the "notifier") near the driver's seat 5. The control device 14 includes a notification controller 43 and a travel prohibitor 44 each in the form of software.

The control device 14 receives detection signals from the left and right position sensors 38. The control device 14 (specifically, the notification controller 43 and the travel prohibitor 44) operates the notification lamp 40, the notification buzzer 45, and the left and right electric motors 8 as below on the basis of the detection signals.

While neither of the position sensors 38 is detecting its corresponding deactivation lever 36 as being at the second position A2 (that is, while the deactivation levers 36 are both at the first position A1), the control device 14 leaves the notification lamp 40 and the notification buzzer 45 off, and operates the electric motors 8 as described under "Operating Electric Motors" above because the travel prohibitor 44 is off.

While at least either of the position sensors 38 is detecting its corresponding deactivation lever 36 as being at the second position A2, the control device 14 blinks the notification lamp 40 and activates the notification buzzer 45 intermittently, and the travel prohibitor 44 prohibits the respective operations of the electric motors 8 regardless of the operation of the travel controller 41. In this state, moving either of the shift levers 12 as described under "Operating Electric Motors" above will not rotate the corresponding electric motor 8.

First Alternative Embodiment

The brake operation sections 30, each of which includes a spring 29 and magnetic coils 31, may alternatively be configured as below.

The brake operation sections 30 include respective left and right brake pedals (not shown in the drawings) for the operator to step on and left and right wires (not shown in the drawings) connecting the brake pedals with the respective brakes 9. Stepping on either of the brake pedals activates the corresponding brake 9, and releasing the brake pedal deactivates the brake 9.

The brake operation sections 30 further include left and right lock members (not shown in the drawings) each configured to keep the corresponding brake pedal as pressed. This allows the brakes 9 to be used as parking brakes as well.

With either of the deactivation levers 36 at the first position A1, stepping on and releasing the corresponding brake pedal as described above activates and deactivates the corresponding brake 9. With either of the deactivation levers 36 at the second position A2, stepping on the corresponding brake pedal will not activate the corresponding brake 9 and will leave it deactivated.

Second Alternative Embodiment

The first alternative embodiment described above may be altered to exclude the lock members and include left and right parking brake levers (not shown in the drawings) in addition to the brake pedals.

This embodiment includes left and right wires (not shown in the drawings) connecting the parking brake levers with the respective brakes 9, and is configured such that the parking brake levers are each capable of being held in position as operated to activate the corresponding brake 9.

Third Alternative Embodiment

The embodiment described above may include only either the notification lamp 40 or the notification buzzer 45.

Further, the embodiment described above may include left and right crawler travel devices (not shown in the drawings) in place of the rear wheels 2.

Fourth Alternative Embodiment

The embodiment described above may be altered to replace the electric motors 8 with an engine (not shown in the drawings) as the travel driver.

This embodiment is configured to divide motive power from the engine and transmit the divided portions to the rear wheels 2 (or crawler travel devices). This embodiment thus has a power transmission system at a point of which the motive power from the engine is divided into portions for the left and right travel devices. This embodiment includes a single brake 9 at a portion of the power transmission system which portion is between the engine and the division point and a clutch (not shown in the drawings) at a portion of the power transmission system which portion is between the engine and the brake 9.

With the clutch disengaged, running the engine will not transmit its motive power to the travel devices. This is the state of the travel driver being off. With the clutch engaged, running the engine will transmit its motive power to the travel devices. This is the state of the travel driver being on.

INDUSTRIAL APPLICABILITY

The present invention is applicable not only to riding-type mowers but also to construction wheel loaders and backhoes, and work vehicles such as tractors and combines.

The invention claimed is:

1. A work vehicle, comprising:
   a body;
   a travel device supporting the body;
   a travel driver configured to drive the travel device;
   a brake configured to lock and unlock the travel device;
   a deactivation operation tool manually movable to a first position, at which the brake is operable to be activated and deactivated, and a second position, at which the brake is kept deactivated; and
   a position detector configured to detect that the deactivation operation tool is at the second position,
   wherein a travel prohibitor configured to prohibit the travel driver from being turned on in response to the result of the detection by the position detector indicating that the deactivation operation tool is at the second position.

2. The work vehicle according to claim 1, further comprising:
   a brake operation section configured to activate the brake in response to the travel driver being turned off and deactivate the brake in response to the travel driver being turned on, and
   wherein moving the deactivation operation tool to the second position is effective regardless of an operation of the brake operation section.

3. The work vehicle according to claim 2, wherein the brake operation section comprises:
   an urging member configured to urge the brake for the activation thereof; and
   an electromagnetic operation section configured to, in response to the travel driver being turned off, allow the urging member to urge the brake for the activation thereof and, in response to the travel driver being turned on, deactivate the brake against an urging force of the urging member.

4. The work vehicle according to claim 1, further comprising a notifier configured to provide, based on a result of the detection by the position detector, a notification that the deactivation operation tool is at the second position.

5. The work vehicle according to claim 4, further comprising:
   an operation shaft coupled to the deactivation operation tool,
      wherein the cam is configured to press the operation member in response to rotation of the deactivation operation tool and coupled to the deactivation operation tool via the operating shaft, and
      wherein the operation member disposed between a plurality of the brake plates and capable of swinging by the cam to keep the plurality of brake plates apart from each other.

6. The work vehicle according to claim 4, further comprising a notifier configured to provide, based on a result of the detection by the position detector, a notification that the deactivation operation tool is at the second position.

7. A work vehicle, comprising:
   a body;
   a travel device supporting the body;
   a travel driver configured to drive the travel device;
   a brake configured to lock and unlock the travel device;
   a deactivation operation tool manually movable to a first position, at which the brake is operable to be activated and deactivated, and a second position, at which the brake is kept deactivated;
   a position detector configured to detect that the deactivation operation tool is at the second position;
   a cam coupled to the deactivation operation tool; and
   an operation member disposed opposite to the cam,
   wherein the break includes a plurality of broken plates,
   wherein the cam is configured to press the operation member,
   wherein the operation member is configured to keep the plurality of brake plates apart from each other, and
   wherein, in response to the position detector detecting that the deactivation operation tool is at the second position, the cam presses the operation member and the operation member keeps the plurality of brake plates apart from each other.

\* \* \* \* \*